(12) United States Patent
Iwaisaki et al.

(10) Patent No.: US 6,312,566 B1
(45) Date of Patent: Nov. 6, 2001

(54) PLASTIC FILM AND PRODUCTION METHOD FOR PLASTIC FILM

(75) Inventors: Yoko Iwaisaki; Isamu Moriguchi, both of Tsuchiura; Makoto Sato, Kyoto; Keitaro Onishi, Otsu, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/596,571

(22) Filed: Jun. 16, 2000

(30) Foreign Application Priority Data

Jun. 17, 1999 (JP) .................................................. 11-170613

(51) Int. Cl.[7] ........................................................ H05F 3/00
(52) U.S. Cl. ............................ 204/165; 427/569; 428/409
(58) Field of Search ............................ 204/165; 427/569; 428/409

(56) References Cited

U.S. PATENT DOCUMENTS 4,297,187  10/1981  Deguchi et al. ..................... 204/165
5,401,446   3/1995  Tsai et al. ............................. 264/22

FOREIGN PATENT DOCUMENTS

| 0346242 A | 12/1989 | (EP) . |
| 5816415 A | 1/1983 | (JP) . |
| WO9605045 A | 2/1996 | (WO) . |

*Primary Examiner*—Cathy Lam
(74) *Attorney, Agent, or Firm*—Birch, Stewart, Kolasch & Birch, LLP

(57) ABSTRACT

An object of the invention is to provide a plastic film that is inapt to cause winding deviation, wrinkling and blocking even under a high-speed running condition. The invention provides a plastic film wherein at least 1,000 positive electrified patterns and at least 1,000 negatively electrified patterns each having an area of at most 10 mm$^2$ and an arbitrary shape are distributed per 100 cm$^2$ of the film, and a polypropylene film wherein the static friction coefficient $\mu_s$ between one surface of the film and another surface of the film is at least 0.2, and the dynamic friction coefficient $\mu_d$ therebetween is at least 0.08.

14 Claims, 3 Drawing Sheets

PLASTIC FILM AND PRODUCTION METHOD FOR PLASTIC FILM

BACKGROUND OF THE INVENTION

The present invention relates to a plastic film formed from polypropylene or the like that has a good running characteristic and to a production method for the same.

Due to their excellent properties, plastic films are widely used for industrial purposes, for example, capacitors. As greater quantities of plastic films are being demanded, speedups in all plastic film-processing steps are lately being pursued.

However, as the processing speed is increased, meandering, deviation, wrinkling and the like during film wind-up and the like have become more likely to occur, and have become factors that impede increases in productivity.

Therefore, a high-speed processing characteristic is required in the plastic film itself. Winding-up characteristic, running characteristic and the like are now important quality requirements.

Conventionally, various proposals have been made to prevent deviation and wrinkling of a plastic film during the slitting, the winding-up and the like of the film. For example, Japanese Patent Application Laid-Open No. SHO 58-16415 discloses that the wetting tension of a non-vapor-deposited surface is specified. Japanese Patent Application Laid-Open No. SHO 60-183449 discloses that the coefficient of static friction of a vapor-deposited film is specified.

Furthermore, Japanese Patent Application Laid-Open No. SHO 62-20137, as for example, proposes a method in which, in a film vapor deposition step, a film is uniformly electrified immediately after the film is unwound, and the film is diselectrified immediately before it is wound up.

However, in the case of polypropylene films, which are relatively apt to have winding deviation, wrinkling or blocking among the plastic films, the aforementioned conventional arts are still insufficient, for example, with regard to the running characteristic or the winding-up characteristic under a high-speed condition of at least 400 m/min.

For example, in the art described in Japanese Patent Application Laid-Open No. SHO 58-16415, both surfaces of a film are subjected to a corona treating process, so that a drawback exists; for example, wrinkling is likely to occur and, therefore, films may block each other. Furthermore, merely specifying the coefficient of static friction of a vapor-deposited film as described in Japanese Patent Application Laid-Open No. SHO 60-183449 is not adequate for the running characteristic in the atmosphere. In either proposal, the drawback is particularly remarkable in, for example, a case where a film has a small thickness of 10 $\mu$m or less, a case where the rigidity of a film is low in comparison with the wind-up tension due to the material of the film, etc.

Furthermore, a method of uniformly electrifying a film immediately after unwinding the film, and diselectrifying the film immediately before winding it up, as described in Japanese Patent Application Laid-Open No. SHO 62-20137, can prevent slippage between a cylindrical can and a guide roller or the like during the film-running and can achieve an improvement with regard to meandering during the running. However, due to the diselectrification immediately before the wind-up, the method is insufficient as a measure for preventing a winding deviation.

SUMMARY OF THE INVENTION

In view of the aforementioned problems, it is an object of the invention to provide a plastic film that does not cause any one of winding deviation, wrinkling and blocking even under a high-speed running condition of, for example, at least 400 m/min in the case of a polypropylene film, as a result of intensive research.

To achieve the aforementioned object, a plastic film according to the invention is a plastic film wherein many fine electrified patterns of the positive and negative polarities on a surface of the film. A characteristic of the electrified patterns is that at least 1,000 positive electrified patterns having areas of at most 10 mm$^2$ and arbitrary shapes, and at least 1,000 negatively electrified patterns having areas of at most 10 mm$^2$ and arbitrary shapes are distributed per 100 cm$^2$ of the film.

In a preferred mode of the invention, an average area of the electrified patterns is within a range of 0.2 mm$^2$ to 1.0 mm$^2$, and at least one positively electrified pattern and at least one negatively electrified pattern exist in an arbitrary circle having a diameter of 1 cm on a surface of the plastic film.

In a polypropylene film, in particular, it is an effective characteristic that at least 2,000 positive electrified patterns having areas of at most 10 mm$^2$ and arbitrary shapes, and at least 2,000 negatively electrified patterns having areas of at most 10 mm$^2$ and arbitrary shapes are distributed per 100 cm$^2$ of the film. It is a more effective characteristic that at least 3,000 positive electrified patterns having areas of at most 10 mm$^2$ and arbitrary shapes, and that an average area of the positively electrified patterns is at most 0.5 mm$^2$.

Furthermore, a polypropylene according to the invention is characterized in that a static friction coefficient $\mu_s$ between one surface of the film and another surface of the film is at least 0.2, and a dynamic friction coefficient $\mu_d$ therebetween is at least 0.08.

It is preferable that the plastic film of the invention be obtained by subjecting a surface of the film to a corona treating process.

The production method for a plastic film of the invention is a plastic film production method wherein at least one film surface is subjected to a corona treating process at least once, and a discharge degree of a last-performed corona treating process is at most 4 W/cm$^2$.

Furthermore, it is preferred that the corona treating process be performed only on one surface of the film.

DESCRIPTION OF REFERENCE NUMERALS

Figure 1:
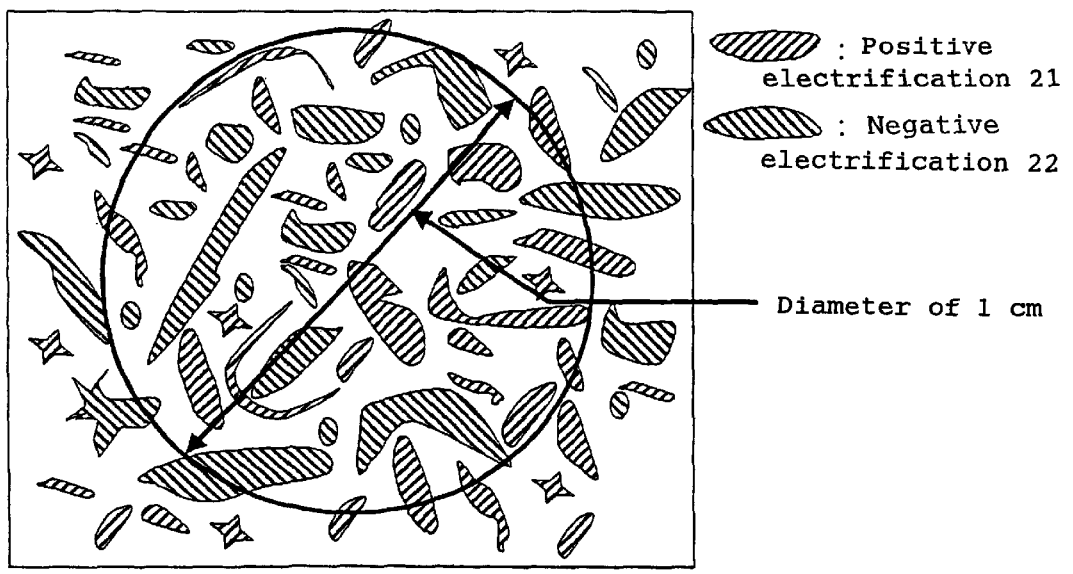
FIG. 1 is a schematic illustration of electrified patterns on a film according to an embodiment of the invention.

1: high-voltage-applied electrode
2: antipole roll
3: antipole roll coating
4: high-frequency AC power supply
5: film
6: nip roll
7: guide roll
8: electrode for strong treatment
9: electrode for weak treatment 10: power supply for strong treatment
11: power supply for weak treatment
21: positively electrified pattern
22: negatively electrified pattern Preferred Embodiments Examples of the plastic film of the invention include polyester films, polypropylene films, polystyrene films, polycarbonate films, polyimide films, polyphenylene sulfide films, aramid films, polyethylene films, and the like. Polypropylene films relatively apt to cause winding deviation, wrinkling and blocking as stated above, and are particularly good as objects for the invention.

The electrified pattern mentioned in the invention refers to a positively or negatively electrified region provided on a film surface. This electrified pattern can be visualized by a dust figure method (described in p. 373, Static Electricity Handbook 1st Edition, edited by the Japanese Institute of Electrostatics). The dust figure method is a method in which electrified color fine particles are floated in the vicinity of an electrified body and are deposited thereon by electrostatic force for image development. A suitable developer for use in the dust figure method is a powder toner that is normally used in color copiers. It is preferred that the developer have an average particle size of several micrometers to several ten micrometers. As for the working environment, the adhesion of the powder changes depending on the ambient humidity. Therefore, it is advisable to perform evaluation in a constant environment having a humidity of 40–60%, etc. for good repeatability.

Since such a positively or negatively electrified pattern exists on a surface of a film, the film is apt to stick to other substances due to the electrostatic force. When the film contacts a metal, an attraction force is produced by the film electrification charges and the charges of the opposite polarity induced on the metal, so that the contact portion between the film and the metal increases. When films contact each other, an attraction force is produced by the electrification charges of opposite polarities on the films, so that the contact portion between the films increases. Since the coefficient of friction thereby increases, slippage between the films is restricted.

Due to the above-described mechanism, the film becomes less likely to undergo meandering caused by slippage between the film and a roll or the like that contacts the film during the running of the film, and winding deviation caused during the winding-up of the film onto a laminating roll. This advantage is particularly great in a film in which the area of an electrified pattern is small, and in which positive and negative areas are densely mixed. Conversely, if the area of an electrified pattern on a film is large, the advantage is not fully enjoyed because an electrostatic defect, such as discharge or the like, is likely to form in that portion on the film or the applied electrification is likely to be removed by a static eliminator provided for a production process or a processing process for the film.

The present inventors have found that a film with an excellent running characteristic can be produced by providing a specific electrified pattern.

As for a guideline for the electrified pattern, at least 1,000 positive electrified patterns having areas of at most 10 $mm^2$ and arbitrary shapes, and at least 1,000 negatively electrified patterns having areas of at most 10 $mm^2$ and arbitrary shapes are distributed per 100 $cm^2$ of the film. Although the upper limit of the number of electrified patterns is not particularly restricted, it is preferred that the number be at most 30,000.

If there are too many electrified patterns, the characteristic of slippage between films deteriorates so that the handling of the film in the operation of taking the film out or the like may become difficult, thereby causing inconveniences. As for the degree of density of electrified patterns, the average area of positively and negatively electrified patterns is preferably within the range of 0.2 $mm^2$ to 1.0 $mm^2$. As a guideline for the mixed distribution of positive and negative electrifications, it is preferred that at least one positively electrified pattern and at least one negatively electrified pattern exist in an arbitrary circle having a diameter of 1 cm on a surface of the plastic film. In a preferable example shown in FIG. 1, positively electrified patterns 21 and negatively electrified patterns 22 are mixed in a circle having a diameter of 1 cm.

Particularly in a polypropylene film, which is relatively apt to cause wrinkling, the presence of more dense electrified patterns is effective, and it is advisable that at least 2,000 positive electrified patterns having areas of at most 10 $mm^2$ and arbitrary shapes, and at least 2,000 negatively electrified patterns having areas of at most 10 $mm^2$ and arbitrary shapes are distributed per 100 $cm^2$ of the film. It is more preferable that at least 3,000 positive electrified patterns having areas of at most 10 $mm^2$ and arbitrary shapes, and wherein an average area of the positively electrified patterns is at most 0.5 $mm^2$. Furthermore, the average area of such positively electrified patterns is preferably 0.5 $mm^2$ or less.

If electrified patterns are provided by discharge, for example, a corona treating process as described below, there is a tendency that negative electrification forms compact patterns of a dotted fashion and positive electrification forms elongated patterns of a dendritic or leaf-like fashion. In order to make a film less apt to slip, that is, to form more dense electrified patterns, it is effective to break elongated positively electrified patterns into finer patterns. In that case, the number of positively electrified patterns can be used as an effective index of denseness.

A method for measuring the area and number of electrified patterns will be described. The area and number of electrified patterns on a film can be determined by using an image processing technique.

An example of the technique will be described below.

(1) The electrification on a film is visualized by a dust figure method employing a positively electrifiable toner (red) and a negatively electrifiable toner (blue).

(2) The visualized film is captured as image data. The capturing means may be a general-purpose scanner, a picture-taking means such as a CCD camera, or the like. It is advisable that the resolution be at least 90 dpi.

(3) The blue (or red) patterns are removed to convert the image into an image having only the positive (or negative) patterns.

(4) The image obtained in (3) is converted into a gray-scale image. The gray scale is preferably of at least 16 levels.

(5) The image obtained in (4) is binarized. The binarization is processed so as to turn the lightness less than 90% into black and the rest into white. Image processing is performed so that the positively (or negatively) electrified patterns become black and the rest become white.

(6) With respect to a certain area (e.g. a square having sides of 10 cm), the number of electrified patterns and the area of each electrified pattern (the number of pixels) are measured. In this step, patterns having an area of 0.1 $mm^2$ or less are considered as noises produced in the image processing, and are not counted. (Steps (3) to (6) can be performed on a general-purpose image processing software)

(7) From the data obtained in (6), the number of patterns and the average area of patterns are calculated.

By the above-described method, data regarding the number and average area of electrified patterns can be obtained.

The electrified patterns are developed in various shapes, such as circular, oval, dendritic or stellar shapes or the like. The electrified patterns may be in any shape.

Mixed presence of positively and negatively electrified regions at approximately equal proportions reduces the apparent electric potential of the film. This can be confirmed by a fact that when a surface of a film-roll is investigated by a surface electrometer (e.g., Statiron DZ by Shishido Electrostatic, LTD.), the measurements by the surface electrometer do not indicate a change corresponding to densely mixed patterns of positive and negative electrifications that actually exist on the film. In the case of a film-roll, if the surface potential is 5 kV or lower, electrostatic troubles, such as peel discharge or the like, become unlikely to occur. This characteristic can also be realized in a film that carries densely mixed patterns of positive and negative electrifications as in the invention.

Furthermore, if a film is laminated into a roll, the surface potential of the roll appears in the form of an accumulation of the electrification potential of each sheet of the film laminate. For example, even if the electric potential of each sheet of film is as low as several ten volts, the surface potential of a roll made by laminating films electrified with the same polarity can become as high as or higher than several ten kilovolts. Therefore, in order to make a specific potential distribution unlikely to occur on a roll of a film, it is preferred that the electrified patterns on the film be random in directions of length and width of the film without any specific frequency.

Furthermore, with regard to the strength of electrification, if the electrification is excessively weak, the force for restricting the meandering and the winding deviation becomes small. If the electrification is excessively strong, it becomes likely to cause an electrostatic defect such as discharge or the like. Therefore, as the strength of electrification, an electrification charge density of about 0.3 to 5 $nC/cm^2$ is favorable. The problems of discharge or the like are affected by the area of electrified patterns as well. Therefore, a favorable area of electrified patterns is 10 $mm^2$ or less. If the area of electrified patterns is equal to or less than 10 $mm^2$, the problems of discharge or the like are unlikely to occur.

The amount of electrification charges can be measured by, for example, a micro-spot type surface electrometer. For example, a surface electrometer of Monroe Electronics (Model-279) has a probe opening of 1.75 mm in diameter, and is able to perform measurement with a spot resolution of 2.5 mm in diameter when the interval between the probe and a measurement surface is set to 0.5 mm. By dividing the surface potential (V) determined by this measurement by the capacitance between the probe and the measurement surface, an amount of electrification charges can be determined. By dividing the amount of charges by the area of electrified patterns, an electrification charge density can be determined. Although the above-described method cannot measure the electrification charge density of electrified patterns that are smaller than the measurement spot, the electrification charge density thereof can be estimated by comparing the fashion of deposition of the developer in the small-size electrified patterns in the dust figure method with those in the measurable large-size electrified patterns.

Figure 2:
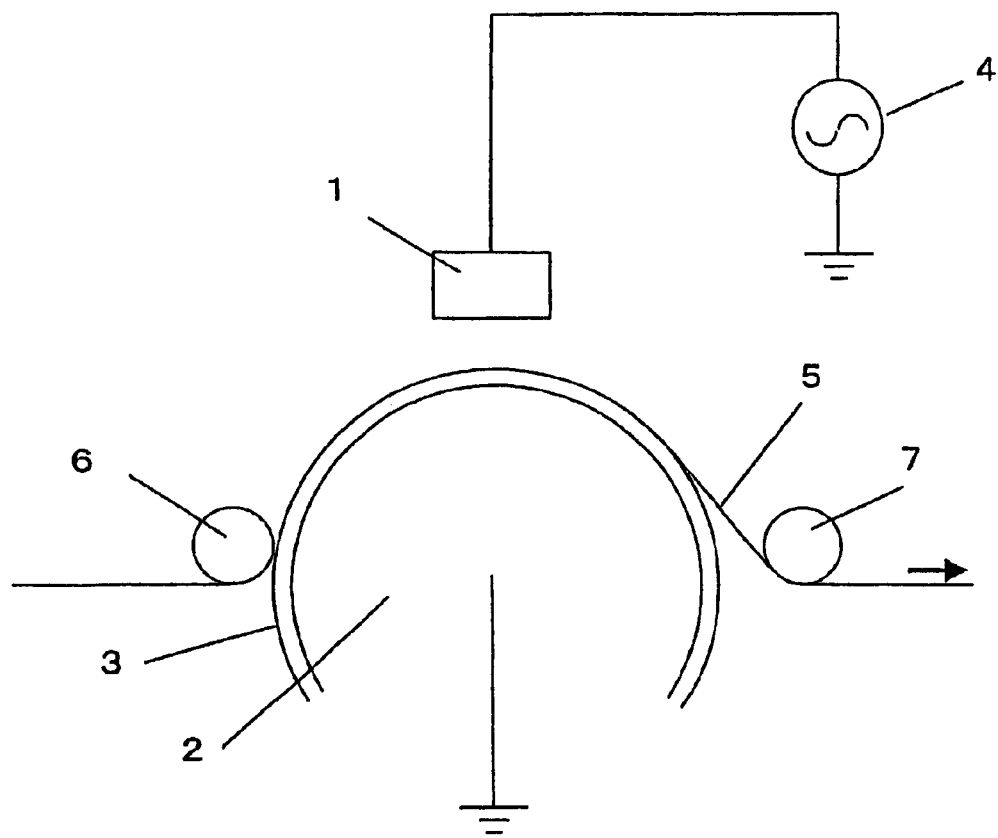
FIG. 2 is a schematic diagram of an apparatus illustrating a method for a corona treating process according to an embodiment of the invention.

The method for providing electrification may be a corona treating process of a film surface. A corona treating process apparatus is formed by, for example, a high-voltage-applied electrode 1, a high-voltage power supply 4, and an antipole roll 2, as shown in FIG. 2. A film 5 wound on the antipole roll 2 is exposed to a region of discharge produced between the high-voltage-applied electrode 1 and the antipole roll 2, whereby the film surface can be treated. In FIG. 2, reference numeral 6 represents a nip roll, and 7 represents a guide roll. The high-voltage-applied electrode 1 is provided in various shapes, for example, a prismatic shape, a wire shape, a blade shape, and the like. The antipole roll 2 is preferably coated with an insulator. If the corona treating process is performed on a film placed on a metal roll having no coating, reforming effect occurs on both sides of the film, so that blocking becomes likely to occur when the film is unwound from a film-roll formed by winding the film treated as described above. Thus, a non-coat metal roll is not preferable. The coat 3 is preferably dielectric, and is preferably excellent in heat resistance and durability. Normally, the coat 3 is formed from rubber or ceramic.

The aforementioned electrified patterns can be realized by adjusting various conditions such as the gap between the electrode and the film, the frequency, the condition of electric power supplied for the corona treating process, and the like. Among these conditions, the condition of supplied power particularly greatly affects the condition of electrified patterns provided. Therefore, to provide electrified pattern as described above, a method of adjusting the power supplied for the corona treating process is the easiest and most reliable.

In the corona treating process, preferable conditions to provide desired electrified patterns are an applied voltage amplitude of 4–15 kV and a discharge degree of 4 $W/cm^2$ or less. A discharge degree exceeding 4 $W/cm^2$ is not preferable because such a discharge degree eliminates the denseness of electrified patterns and makes the film likely to slip.

The discharge degree mentioned above represents the power supplied to the discharge electrode per unit area, and can be expressed as in the following equation:

$$\text{discharge degree } (W/cm^2) = \text{supplied power } (W)/\text{area of discharge electrode } (cm^2) \quad (1)$$

The supplied power in equation (1) refers to the power actually supplied to the discharge electrode. The supplied power can be obtained as an integral of the multiplication product of an instantaneous voltage and an instantaneous current (i.e., instantaneous power) over unit time. The supplied power can also be calculated by using a measurement method as follows. The antipole roll is grounded via a capacitor. An oscilloscope is set to an X-Y mode, and the electrode voltage is inputted to the X axis and the capacitor voltage is inputted to the Y axis. The area of a Lissajous figure drawn in the oscilloscope is read, and the value read is multiplied by the frequency to determine a supplied power. The supplied power mentioned herein is obtained by subtracting a power loss caused by a vacuum tube, a high-frequency transformer and the like from the power supply output power generally indicated in the power supply. That is, it is the power that contributes to the actual discharge.

The area of the discharge electrode in equation (1) refers to the area of a portion of the electrode surface that discharges. However, if discharge light is observed substantially over the entire surface of the electrode surface facing the film, the area of an image of the electrode projected on the film surface may be calculated as the aforementioned area of the discharge electrode. As a guideline, if the discharge electrode is an electrode having a circular section, such as a wire or the like, the area of the discharge electrode can be determined by the aforementioned simple and easy method provided that the radius of the electrode is at most 3 mm. If the discharge electrode is a blade electrode or a bar electrode, the area of the discharge electrode can be determined by determining the area of an image of a distal end portion of the electrode projected on the film surface provided that the radius of curvature of the distal end portion, which contributes to discharge, is at most 3 mm. In other cases, it is advisable to calculate the area of a region that emits light during discharge as an area of the discharge electrode.

The discharge degree is specified only when discharge is actually observed. The minimum discharge degree, which occurs when discharge starts after the voltage applied to the electrode is gradually increased from a state where no discharge is observed, varies depending on conditions such as the shape of the electrode, the gap thereof, the antipole roll, the film property, and the like. Therefore, it is impossible to determine an optimal lower limit of the discharge degree.

The gap between the electrode and the film is preferably at most 2 mm. If the gap is smaller, the positively and negatively electrified patterns provided on the film can be made smaller and distributed more densely and closely, so that the film becomes more inapt to slip. However, if the gap is excessively small, the electrode contacts the film or the antipole roll due to thermal expansion or eccentricity of the roll, so that the film may break or the electrode or the antipole roll may be damaged. Therefore, it is advisable to secure at least a gap of at least 0.2 mm.

In a polypropylene film according to the invention, it is preferred that the wetting tension on the surface be at least 34 mN/m. If the wetting tension on the surface is less than 34 mN/m, a drawback may occur in post-process steps, such as vapor deposition, printing, etc.

The wettability of the polypropylene film can be improved by the corona treating process. In order to obtain a film having a wetting tension on surface of at least 34 mN/m, it is preferred to perform a corona treating process with a discharge degree exceeding 4 W/cm$^2$. In order to provide dense electrified patterns on the film surface by the corona discharge process, a weak corona treating process with a discharge degree of at most 4 W/cm$^2$ is preferred. Therefore, if it is desired to achieve both the effect of the corona treating process improving the wettability and the effect of the corona treating process providing dense electrified patterns, it is preferred to perform the corona treating process a plurality of times including at least once for a process with a discharge degree of at most 4 W/cm$^2$ and at least once for a process with a discharge degree exceeding 4 W/cm$^2$. It is effective to perform the last process under a process condition of a discharge degree of at most 4 W/cm$^2$ because the final electrified patterns provided on the film surface are determined by the process condition of the last corona treating process.

Figure 3:
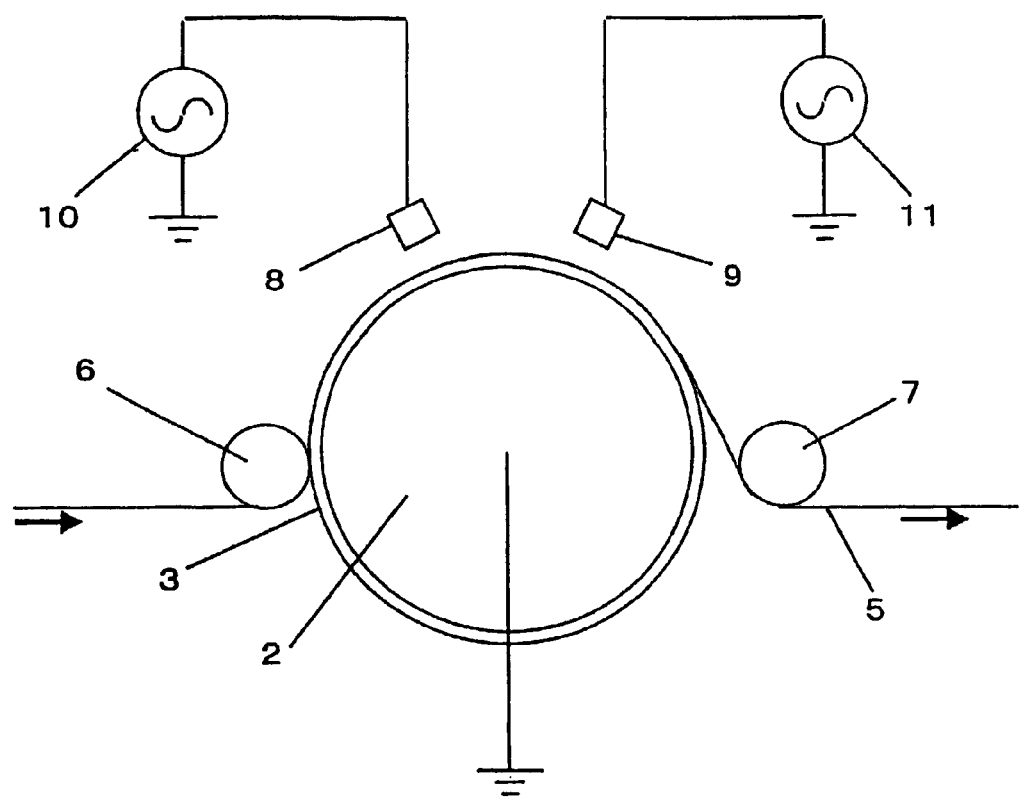
FIG. 3 is a schematic diagram of an apparatus illustrating a method for performing the corona treating process a plurality of times according to an embodiment of the invention.

As an example, a process method for performing the discharge process twice is illustrated in FIG. 3. In FIG. 3, an electrode for strong treatment 8 and a power supply 10 for the electrode 8 are provided upstream, and an electrode for weak treatment 9 and a power supply 11 for the electrode 9 are provided downstream.

In order to prevent blocking, It is preferred to perform the corona treating process only on a single surface of the film. Particularly, in the case of a film of 10 µm or less in thickness, which has the danger of wrinkling and blocking, it is preferred to perform the corona treating process a plurality of times as described above on a single surface of the film.

The electrification as described above makes the film inapt to slip. The inaptness of the film can be quantified based on the coefficient of friction. That is, a polypropylene film according to the present invention is characterized in that the static friction coefficient $\mu_s$ between one surface and the other surface of the film is at least 0.2 and the dynamic friction coefficient $\mu_d$ therebetween is at least 0.08.

The static friction coefficient $\mu_s$ and the dynamic friction coefficient $\mu_d$ in the invention refer to values obtained by dividing by 100 the values of a static friction resistance force (g) and a dynamic friction resistance force (g) detected by a U-gauge in a condition where one of two films laminated so that the corona treating-processed surface and the non-processed surface are in contact is pulled to slide in a direction of a width of the film surface at a speed of 150 mm/min. The two films laminated are rectangular pieces cut out from a film so as to have a size of 10 cm in the direction of width and 7.5 cm in the direction of length.

In the case of a polypropylene film, a static friction coefficient $\mu_s$ less than 0.2 likely causes a winding deviation in slit and rewinding steps and the like, and therefore is not preferable. If the static friction coefficient is excessively high, wrinkling becomes likely to occur. A preferable value of the static friction coefficient is at least 0.3 and at most 2.

A dynamic friction coefficient $\mu_d$ less than 0.08 likely causes a winding deviation in the slit and rewinding steps and the like, and therefore is not preferable. If the dynamic friction coefficient is excessively high, wrinkling becomes likely to occur. A preferable value of the dynamic friction coefficient is at least 0.1 and at most 1.5.

The absolute value of the surface potential of a polypropylene film according to the invention is preferably at most 5 kV. If 5 kV is exceeded, wrinkling becomes likely to occur, or an electrostatic problem may occur. It is more preferable that the absolute value of the surface potential be at least 0.1 kV and at most 4 kV. It is also preferable that plus and minus polarities be not mixed.

The center-axis average roughness of a surface of the polypropylene film in the invention is preferably at least 0.02 µm and at most 5 µm. If it is less than 0.02 µm, there is a tendency that wrinkling will likely occur, and there is also a tendency that winding deviation will likely occur because the characteristic of releasing air accompanying the film during rewinding becomes poor. If the center-axis average roughness exceeds 0.5 µm, winding deviation becomes likely to occur. It is more preferable that the center-axis average roughness be at least 0.03 µm and at most 0.3 µm.

The thickness of the film of the invention is not particularly limited. However, considering the ease of production, it is preferred that in the case of a polypropylene film, the thickness be about 2–60 µm and in the case of a polyester film, the thickness be about 0.5–500 µm. Furthermore, the rigidity of the film has an adverse effect in some cases. Therefore, a thin film of at most 30 µm as represented by a capacitor-purpose film is preferable.

The width of the polypropylene film of the invention is preferably at least 10 mm and at most 2000 mm, in terms of the characteristic of releasing accompanying air during a winding process or the like.

The polymer forming the polypropylene film of the invention may be a copolymer of propylene and a different α-olefin (e.d., ethylene, butene, etc.), a blend of polypropylene and a different α-olefin polymer (e.g. polyethylene, polybutene, ect.), or the like, in addition to polypropylene homo-polymer.

The isotactic index of a polypropylene resin used for the polypropylene film of the invention is preferably at least 96%.

The method for stretching the polypropylene film of the invention may be a tenter method, an inflation method or the like, and may also be monoaxial stretching or biaxial stretching. In the case of biaxial stretching, either progressive biaxial stretching or simultaneous biaxial stretching may be employed. However, for the use as a capacitor-purpose film, a tenter method based on biaxial stretching is preferred because a reduced thickness and a reduced thickness inconsistency are required.

The atmosphere gas for the corona treating process may be air, carbon monoxide gas, or other gases.

If a static eliminating process is performed in any step after the film formation of a polypropylene film, the static electricity removing method may be, for example, methods employing an alternate-current-type static electricity removing device, an alternate-current-type air-blowing static eliminator, an electrically conductive cloth, or the like. A combination of static electricity removing devices, the number of times and the timing of removing static electricity, and the like may be suitably selected. However, if the corona treating process is performed on the film, it is preferred to perform diselectrification immediately following the corona treating process. By this manner of removing static electricity, the potential of the entire film can be reduced. Furthermore, the dense patterns of positive and negative electrifications mentioned in the invention are not substantially removed by a typical combination of static electricity removing devices.

Among the static electricity removing devices and the static eliminators mentioned above, devices or the like that, in principle, produce ions by corona discharge from a distal end of a needle-shaped or fine-wire electrode or the like so that ions neutralize the electrification of the film are normally used. Such static electricity removing devices and static eliminators are different from the aforementioned corona treating process. A typical corona treating processing device has a construction as shown in FIG. 2 in which a grounded electrode is disposed to face a high-voltage application electrode from below, with a film being disposed between the electrodes. In such a device, corona discharge is generated by high-frequency fields between the electrodes. The corona treating process is a process whereby a film surface is processed by exposing the film to a lighting discharge atmosphere. Therefore, the interval between the high-voltage application electrode and the film is normally small, that is, at most 10 mm. On the other hand, in a static eliminator that uses corona discharge, the film is not exposed to a lighting discharge region, and the interval between the high-voltage application electrode and the film is normally large, that is, at least 10 mm. In a normal construction, the counter electrode is not disposed behind the film. These differences distinguish a corona treating processing device and a static electricity removing device.

Furthermore, the polypropylene film of the invention may be metallized. The metallizing method may be, for example, a vacuum vapor deposition method, a sputtering method, or the like. Particularly, a vacuum vapor deposition is preferable in terms of productivity. Examples of the metal used for the metallization include single materials such as aluminum, zinc, copper, tin, silver, nickel, cobalt, etc. and mixtures of these materials.

An example of a preferred film production method according to the invention will be described.

A polypropylene resin having an isotactic index of at least 95% is supplied to an extruder having a temperature of 190–270° C. and is melted therein, and then is extruded from a slitted T-die into a sheet shape. The sheet is cooled and solidified on a cooling roll having a temperature of 20–100° C. and, more preferably, 40–90° C. In this case, the surface roughness can be adjusted by selecting a temperature of the cooling roll. Subsequently, the sheet is stretched at a temperature of 150–170° C. to 3–6 times in the direction of length. In this case, the surface roughness can be adjusted by selecting a stretching temperature. Subsequently, the sheet is stretched at 150–170° C. to 7–12 times in the direction of width. After that, the sheet is heat-treated at a temperature of 150–170° C. After one surface of the film is subjected to a suitable corona treating process, the same surface is subjected to a corona treating process with a strength that is less than the strength of the previous process. Then, the sheet is wound up by a winder. At this stage, consideration should be given so that the corona treating process does not leak to the reverse surface. Then, using an alternate-current-type static electricity removing device having a corona treating surface disposed at a distance of 30–200 mm from the processed film surface, diselectrification with an output of 5–12 kV is performed.

The thus-obtained film is cut by a slitter. At this stage, using an alternate-current-type air-blowing static eliminator disposed at a distance of 50–300 mm from the film, static electricity is removed with an output of 5–12 kV, in a winding portion (wind-up portion).

Next described will be a measurement method and an evaluation method employed in the invention.

[1] Number and Average Area of Electrified Patterns (1) The electrifications of the film were visualized by a dust figure method. In this method, a positively electrifiable toner (red) and a negatively electrifiable toner (blue) of different colors were used to discriminate the positive and negative electrifications. The toners used in this method had specifications indicated below. The visualization by the dust figure method was performed in an environment of a humidity of 50%.

Positively electrifiable toner:
  Color: red
  Particle size (weight average particle size): 14.8 $\mu$m
  (6 $\mu$m or less: 0.2 wt. %, 25 $\mu$m or greater: 1.8 wt. %)
  Specific charge: −1.2 $\mu$C/g Negatively electrifiable toner:
  Color: blue
  Particle size (weight average particle size): 12.5 $\mu$m
  (6 $\mu$m or less: 0.8 wt. %, 25 $\mu$m or greater: 1.6 wt. %)
  Specific charge: −23.1 $\mu$C/g The average particle sizes of the toners indicated above were values measured by MULTISIZER II by COULTER using an aperture tube of 100 $\mu$m in diameter. The specific charges are values measured by a blow-off electrification amount measuring device (TB-500 Model by Toshiba Chemical). More specifically, a measurement-object toner and an iron-power carrier (TSV-200R by Powdertech) were mixed at a weight ratio of 1:19, and the mixture was stirred for 5 minutes by a ball mill to provide a power sample. Then, 0.2 g of the power sample was placed in a measurement cell of the electrification amount measuring device. Measurement was performed at a blow pressure of 0.5 kg/cm$^2$ for a blow time of 60 sec, using a 400-mesh stainless steel mesh as a mesh screen. The measured value was divided by the weight of the toner (0.2 g×$\frac{1}{20}$=01 g) to determine the value of the specific charge.

(2) The visualized film was read by a color scanner, thereby obtaining digital data. The resolution was 300 dpi, and the gradation was a 256-level scale for each of RGB. The scanner used was a Sapphire by a German company, Linotype Hell (Heidelberg Prepress).

(3) The image data was separated into blue (positive) and red (negative) images by a photo-retouch software (PhotoShop ver. 3.0J). The separation was performed as follows. Using a color substitute command, red regions, as for example, were changed into white so that only the blue patterns were left. For this process, the central color of the substitute color and the permissible range thereof were set as follows:

Red designation:
RGB=198, 31, 60 Permissible range: 200
Blue designation:
RGB=20, 70, 170 Permissible range: 180

(4) Then, using the same software (PhotoShop ver. 3.0 J), the blue and red images were separately converted into gray-scale images, and then were binarized. The binarization was performed so as to convert lightness less than 90% into black and lightness of 90% or greater into white. In this manner of conversion, an image in which the positively (or negatively) electrified portions were black and the other portions were white was obtained.

(5) A given black pixel (electrified portion) was defined as a center pixel, and the surrounding 8 pixels were checked. If among them, a black pixel existed, the pixels were considered to belong to the same mass. This process was performed on the entire picture screen.

(6) With respect to a square image having sides of 10 cm, the number of masses of black pixels detected in (5) was counted, and the number of pixels in each mass was determined.

(7) Electrified patterns having an area of at most 0.1 mm$^2$ (i.e., black-pixel masses equivalent to at most 14 pixels in the image) were regarded as noises produced in the image processing, and were deleted from the data.

(For the process of (5) to (7), HALCON ver. 5, i.e., an image processing software by German MNVTec, was used.)

(8) From the data obtained in (7), the number of patterns and the average area of patterns were calculated.

By the method as described above, data regarding the number and the average area of electrified patterns was obtained.

[2] Friction Coefficients

The film was cut into rectangular pieces having a size of 10 cm in the direction of width and 7.5 cm in the direction of length. Two pieces were laminated so that the corona treating-processed surface of one piece and the non-processed surface of the other piece were in contact. The static friction resistance force (g) and the dynamic friction resistance force (g) occurring when one of the two laminated pieces of film was pulled to slide in a direction of a width of the film surface at a speed of 150 mm/min were detected by a U-gauge. The detected values were divided by 100 to obtain a static friction coefficient $\mu_s$ and a dynamic friction coefficient $\mu_d$.

Five measurements were obtained, and the mean value thereof was used.

[3] Surface Potential

At a distance of 50 mm from the surface of a roll of the wound-up film, surface potentials at 5 points equidistantly defined in the direction of width of the roll were measured by a Statiron DZ (by Shishido Electrostatic, LTD.). The mean value of the surface potentials measured at the 5 points was used.

[4] Center-line Average Roughness Ra

Measurement was performed according to JIS-B-0601. The cut-off was 0.25 mm. The number of measurements was 3, and the mean value thereof was used.

[5] Incidence of Wrinkling, Winding Deviation

A film was slitted into a size of 630 mm in width and 34,000 m in length, and was wounded up to provide a sample. The film was further slitted, with respect to the direction of width, into 12 strips of 50 mm in width, and was slitted, with respect to the direction of length, into 6 narrow reels of 5,600 m in lengths, at a speed of 400 m/min. The incidence of wrinkling and the incidence of winding deviation were determined as in the following equations:

Wrinkling incidence (%)=number of reels of wrinkling/total number of reels (72)×100

Winding deviation incidence (%)=number of reels of winding deviation/total number of reels (72)×100

For each incidence, an incidence of at most 7% was regarded as passed.

[6] Wetting Tension

Measurement was performed according to ASTM D2578.

The invention will next be described with reference to examples.

EXAMPLE 1

One surface of a PET (polyethylene terephthalate) film ("Lumirror" by Toray Industries, Inc., 7 microns in thickness) was subjected to a corona treating process. The processing conditions were as follows:

Discharge degree: 2.5 w/cm$^2$

Applied voltage amplitude: 6 kV

Power supply frequency: 42 kHz

Electrode configuration: blade electrodes having a distal end radius of 2 mm, in a 4-row array Electrode-film gap: 0.8 mm Film running speed: 50 m/min Antipole roll; metal roll with a 3 mm-thick silicon rubber coat Room temperature, humidity: 20° C., 50%

The film processed under the aforementioned conditions was treated with a positively electrifiable toner (red) and a negatively electrifiable toner (blue) for a color copier, thereby visualizing the positively and negatively electrified states separately. The numbers and areas of electrified patterns were determined by the above-described technique. Results are shown in Table 1. 2422 positively electrified patterns and 1203 negatively electrified patterns having areas of at most 10 mm$^2$ and arbitrary shapes existed per 100 cm$^2$ on the film. The average area of positively electrified patterns was 0.65 mm$^2$. The average area of negatively electrified patterns was 0.53 mm$^2$.

Comparative Example 1

A PET (polyethylene terephthalate) film ("Lumirror" by Toray Industries, Inc., 7 microns in thickness) was processed in substantially the same manner as in Example 1, except that the conditions of the corona treating process were changed as follows.

Discharge degree: 5.6 W/cm$^2$

Applied voltage amplitude: 10 kV (Other conditions were the same as in Example 1)

The film processed under the aforementioned conditions was treated with a positively electrifiable toner (red) and a negatively electrifiable toner (blue) for a color copier, thereby visualizing the positively and negatively electrified states separately. The numbers and areas of electrified patterns were determined by the above-described technique. Results are shown in Table 1. 85 positively electrified patterns and 42 negatively electrified patterns having areas of at most 10 mm$^2$ and arbitrary shapes existed per 100 cm$^2$ on the film. The average area of positively electrified patterns was 0.15 mm$^2$. The average area of negatively electrified patterns was 0.23 mm$^2$.

EXAMPLE 2

A PP (polypropylene) film ("torayfan" BO (not processed with corona discharge) by Toray Industries, Inc., 4 microns in thickness) was processed in substantially the same manner as in Example 1. except that the conditions of the corona treating process were changed as follows.

Discharge degree: 1.9 W/cm$^2$

Applied voltage amplitude: 5.5 kV (Other conditions were the same as in Example 1)

The film processed under the aforementioned conditions was treated with a positively electrifiable toner (red) and a negatively electrifiable toner (blue) for a color copier, thereby visualizing the positively and negatively electrified states separately. The numbers and areas of electrified patterns were determined by the above-described technique. Results are shown in Table 1. 5267 positively electrified patterns and 3553 negatively electrified patterns having areas of at most 10 mm$^2$ and arbitrary shapes existed per 100 cm$^2$ on the film. The average area of positively electrified patterns was 0.38 mm$^2$. The average area of negatively electrified patterns was 0.48 mm$^2$.

The static friction coefficient $\mu_s$ of the thus-formed film was 0.49, and the dynamic friction coefficient $\mu_d$ thereof was 0.22. The film was inapt to slip.

Comparative Example 2

A PP (polypropylene) film ("Torayfan" BO (not processed with corona discharge) by Toray Industries, Inc., 4 microns in thickness) was processed in substantially the same manner as in Example 1, except that the conditions of the corona treating process were changed as follows.

Discharge degree: 5.6 W/cm$^2$

Applied voltage amplitude: 10 kV (Other conditions were the same as in Example 1)

The film processed under the aforementioned conditions was treated with a positively electrifiable toner (red) and a negatively electrifiable toner (blue) for a color copier, thereby visualizing the positively and negatively electrified states separately. The numbers and areas of electrified patterns were determined by the above-described technique. Results are shown in Table 1. 33 positively electrified patterns and 103 negatively electrified patterns having areas of at most 10 mm$^2$ and arbitrary shapes existed per 100 cm$^2$ on the film. The average area of positively electrified patterns was 0.19 mm$^2$. The average area of negatively electrified patterns was 0.23 mm$^2$.

The static friction coefficient $\mu_s$ of the thus-formed film was 0.06, and the dynamic friction coefficient $\mu_d$ thereof was 0. The film was apt to slip.

EXAMPLE 3

A polypropylene resin having an isotactic index of 97% was supplied to an extruder having a temperature of 240° C., and was melted therein, and then was extruded from a slitted T-die into a sheet shape. The sheet was cooled and solidified on a cooling roll having a temperature of 80° C.

Subsequently, the sheet was stretched at a temperature of 130° C. to 5 times in the direction of length. Subsequently, the sheet was stretched at 160° C. to 9 times in the direction of width. After that, the sheet was heat-treated at a temperature of 155° C.

One surface of the thus-obtained film was subjected to a corona treating process with the strength being a discharge degree of 2.0 W/cm$^2$, while consideration was being given so as not to allow the corona treating process to leak to the reverse surface. After that, an alternate-current-type static electricity removing device KOR Model (by Kasuga Denki) was employed on the side of the corona treating processed-surface to perform diselectrification under the conditions of a distance of 100 mm from the film and an output of 9 kV. The film was then wound up by a winder. The thickness of the film was 5 μm. The electrified states on the thus-processed film were visualized under the same conditions as in Example 1. The numbers and areas of electrified patterns were determined by the image processing technique. Results are shown in Table 1. 4494 positively electrified patterns and 2959 negatively electrified patterns having areas of at most 10 mm$^2$ and arbitrary shapes existed per 100 cm$^2$ on the film. The average area of positively electrified patterns was 0.45 mm$^2$. The average area of negatively electrified patterns was 0.70 mm$^2$.

The static friction coefficient $\mu_s$ of the thus-formed film was 0.56, and the dynamic friction coefficient $\mu_d$ thereof was 0.2. The film was inapt to slip.

Comparative Example 3

A polypropylene film was obtained by processing a polypropylene resin having an isotactic index of 97% under substantially the same conditions as in Example 3, except that the corona treating process was performed with the strength being a discharge degree of 9.1 W/cm$^2$. The thickness of the film was 5 μm. The electrified states on the thus-processed film were visualized by the same method as in Example 1.

Results are shown in Table 1. 312 positively electrified patterns and 254 negatively electrified patterns having areas of at most 10 mm$^2$ and arbitrary shapes existed per 100 cm$^2$ on the film. The average area of positively electrified patterns was 0.18 mm$^2$. The average area of negatively electrified patterns was 0.22 nm$^2$.

The static friction coefficient $\mu_s$ of the film was 0.08, and the dynamic friction coefficient $\mu_d$ thereof was 0. The film was apt to slip.

EXAMPLE 4

A polypropylene resin having an isotactic index of 97% was supplied to an extruder having a temperature of 240° C., and was melted therein, and then was extruded from a slitted T-die into a sheet shape. The sheet was cooled and solidified on a cooling roll having a temperature of 80° C.

Subsequently, the sheet was stretched at a temperature of 130° C. to 5 times in the direction of length. Subsequently, the sheet was stretched at 160° C. to 9 times in the direction of width. After that, the sheet was heat-treated at a temperature of 155° C.

One surface of the thus-obtained film was subjected to a corona treating process with the strength being a discharge degree of 9.1 W/cm$^2$ and was subsequently subjected to a corona treating process with the strength being a discharge degree of 2.1 W/cm², while consideration was being given so as not to allow the corona treating process to leak to the reverse surface. After that, an alternate-current-type static electricity removing device KOR Model (by Kasuga Denki) was employed on the side of the corona treating processed-surface to perform diselectrification under the conditions of a distance of 100 m from the film and an output of 9 kV. The film was then wound up by a winder.

The wound-up film was slitted into a size of 630 mm in width and 34,000 m in length. In this stage, using an alternate-current-type air-blowing static eliminator BLL Model (by Kasuga Denki), diselectrification was performed under the conditions of an output of 9 kV and a distance of 150 mm from the film. The thickness of the obtained film was 5 µm. The wetting tension thereof was 38 mN/m. The static friction coefficient $\mu_s$ thereof was 0.32, and the dynamic friction coefficient $\mu_d$ thereof was 0.20. The absolute value of the surface potential thereof was 3.5 kV. The center-line average roughnesses Ra of the corona treating processed-surface and the other surface were 0.04 µm and 0.08 µm. respectively. The obtained film was slitted, with respect to the direction of width, into 12 strips of 50 mm in width by a small-width slitter, and was slitted, with respect to the direction of length, into 6 narrow reels of 5,600 m in lengths, at a speed of 400 m/min, to evaluate occurrence of wrinkling and winding deviation. The incidence of wrinkling and the incidence of winding deviation were both 0%. Furthermore, blocking did not occur either during or after the processing. Results are shown in Table 2.

EXAMPLE 5

A polypropylene film was obtained by processing a polypropylene resin having an isotactic index of 97% under substantially the same conditions as in Example 4, except that a single surface of the film was subjected to a corona treating process with the strength being a discharge degree of 9.1 W/cm² and then to a corona treating process with the strength being a discharge degree of 1.3 W/cm². The thickness of the film was 5 µm.

The obtained film was slitted into a size of 630 mm in width and 34,000 m in length under the same conditions as in Example 4.

The wetting tension of the film was 38 mN/m. The static friction coefficient $\mu_s$ thereof was 0.26, and the dynamic friction coefficient $\mu_d$ thereof was 0.16. The absolute value of the surface potential thereof was 3.0 kV.

The film was further slitted, with respect to the direction of width, into 12 strips of 50 mm in width by a small-width slitter, and was slitted, with respect to the direction of length, into 6 narrow reels of 5,600 m in lengths. Evaluation was made under the same conditions as in Example 4.

The incidence of wrinkling was 0%, and the incidence of winding deviation was 1.4%. Results are shown in Table 2.

EXAMPLE 6

A polypropylene film was obtained by processing a polypropylene resin having an isotactic index of 97% under substantially the same conditions as in Example 4, except that the temperature of the cooling roll was 20° C. The thickness of the film was 5 µm.

The obtained film was slitted into a size of 630 mm in width and 34,000 m In length under the same conditions as in Example 4.

The wetting tension of the film was 38 mN/m. The static friction coefficient $\mu_s$ thereof was 0.92, and the dynamic friction coefficient $\mu_d$ thereof was 0.87. The absolute value of the surface potential thereof was 3.5 kV. The Ra of the corona treating processed-surface and the Ra of the other surface were both 0.02 µm.

The film was further slitted, with respect to the direction of width, into 12 strips of 50 mm in width by a small-width slitter, and was slitted, with respect to the direction of length, into 6 narrow reels of 5,600 m in lengths. Evaluation was made under the same conditions as in Example 4.

The incidence of wrinkling was 5.6%, and the incidence of winding deviation was 4.2%. Results are shown in Table 2.

Comparative Example 4

A polypropylene film was obtained by processing a polypropylene resin having an isotactic index of 97% under substantially the same conditions as in Example 4, except that only the corona treating process with the strength being a discharge degree of 9.1 W/cm² was performed. The thickness of the film was 5 µm.

The obtained film was slitted into a size of 630 mm in width and 34,000 m in length under the same conditions as in Example 4.

The static friction coefficient $\mu_s$ of the film was 0.08, and the dynamic friction coefficient $\mu_d$ thereof was 0. The absolute value of the surface potential thereof was 8.0 kV.

The film was further slitted, with respect to the direction of width, into 12 strips of 50 mm in width by a small-width slitter, and was slitted, with respect to the direction of length, into 6 narrow reels of 5,600 m in lengths. Evaluation was made under the same conditions as in Example 4.

The incidence of wrinkling was 2.8%, and the incidence of winding deviation was 15.3%. Results are shown in Table 2.

Comparative Example 5

A polypropylene film was obtained by processing a polypropylene resin having an isotactic index of 97% under substantially the same conditions as in Example 4, except that a single surface of the film was subjected to a corona treating process with the strength being a discharge degree of 4.8 W/cm² and then to a corona treating process with the strength being a discharge degree of 4.8 W/cm². The thickness of the film was 5 µm.

The obtained film was slitted into a size of 630 mm in width and 34,000 m in length under the same conditions as in Example 4.

The static friction coefficient $\mu_s$ of the film was 0.20, and the dynamic friction coefficient $\mu_d$ thereof was 0.02. The absolute value of the surface potential thereof was 4.0 kV.

The film was further slitted, with respect to the direction of width, into 12 strips of 50 mm in width by a small-width slitter, and was slitted, with respect to the direction of length, into 6 narrow reels of 5,600 m in lengths. Evaluation was made under the same conditions as in Example 4.

The incidence of wrinkling was 2.8%, and the incidence of winding deviation was 16.7%. Results are shown in Table 2.

Comparative Example 6

A polypropylene film was obtained by processing a polypropylene resin having an isotactic index of 97% under substantially the same conditions as in Example 4, except that a single surface of the film was subjected to a corona treating process with the strength being a discharge degree of 2.1 W/cm² and then to a corona treating process with the strength being a discharge degree of 9.1 W/cm². The thickness of the film was 5 µm.

The obtained film was slitted into a size of 630 mm in width and 34,000 m in length under the same conditions as in Example 4.

The static friction coefficient $\mu_s$ of the film was 0.12, and the dynamic friction coefficient $\mu_d$ thereof was 0.08. The absolute value of the surface potential thereof was 5.0 kV.

The film was further slitted, with respect to the direction of width, into 12 strips of 50 mm in width by a small-width slitter, and was slitted, with respect to the direction of length, into 6 narrow reels of 5,600 m in lengths. Evaluation was made under the same conditions as in Example 4.

The incidence of wrinkling was 9.7%, and the incidence of winding deviation was 11.1%. Results are shown in Table 2.

Comparative Example 7

A polypropylene film was obtained by processing a polypropylene resin having an isotactic index of 97% under substantially the same conditions as in Example 4, except that one surface of the film was subjected to a corona treating process with the strength being a discharge degree of 9.1 W/cm$^2$ and then the reverse surface was subjected to a corona treating process with the strength being a discharge degree of 2.1 W/cm$^2$. The thickness of the film was 5 μm.

The obtained film was slitted into a size of 630 mm in width and 34,000 m in length under the same conditions as in Example 4.

The static friction coefficient $\mu_s$ of the film was 0.89, and the dynamic friction coefficient $\mu_d$ thereof was 0.75. The absolute value of the surface potential thereof was 10.2 kV.

The film was further slitted, with respect to the direction of width, into 12 strips of 50 mm in width by a small-width slitter, and was slitted, with respect to the direction of length, into 6 narrow reels of 5,600 m in lengths. Evaluation was made under the same conditions as in Example 4.

The incidence of wrinkling was 18.1%, and the incidence of winding deviation was 0%.

During the small-width-slitting of the film into the width of 50 mm, a blocking tendency was observed in a 630 mm-width roll unwinding portion. Results are shown in Table 2.

Comparative Example 8

A polypropylene film was obtained by processing a polypropylene resin having an isotactic index of 97% under substantially the same conditions as in Example 4, except that one surface of the film was subjected to a corona treating process with the strength being a discharge degree of 9.1 W/cm$^2$, and the same surface was subjected to a corona treating process with the strength being a discharge degree of 2.1 W/cm$^2$, and then the reverse surface was subjected to a corona treating process with the strength being a discharge degree of 2.1 W/cm$^2$. The thickness of the film was 5 μm.

The obtained film was slitted into a size of 630 mm in width and 34,000 m in length under the same conditions as in Example 4.

The static friction coefficient $\mu_s$ of the film was 1.06, and the dynamic friction coefficient $\mu_d$ thereof was 0.98. The absolute value of the surface potential thereof was 11.3 kV.

The film was further slitted, with respect to the direction of width, into 12 strips of 50 mm in width by a small-width slitter, and was slitted, with respect to the direction of length, into 6 narrow reels of 5,600 m in lengths. Evaluation was made under the same conditions as in Example 4.

The incidence of wrinkling was 25.0%, and the incidence of winding deviation was 0%.

During the small-width-slitting of the film into the width of 50 mm, a blocking tendency was observed in a 630 mm-width roll unwinding portion. Results are shown in Table 2.

TABLE 1

| Unit | Number of electrified patterns per 100 cm$^2$ | | Average area of electrified patterns | |
|---|---|---|---|---|
| | Positive Number | Negative Number | Positive mm$^2$ | Negative mm$^2$ |
| Example 1 | 2422 | 1203 | 0.65 | 0.53 |
| Example 2 | 5267 | 3553 | 0.38 | 0.48 |
| Example 3 | 4494 | 2959 | 0.45 | 0.70 |
| Comparative example 1 | 85 | 42 | 0.45 | 0.23 |
| Comparative example 2 | 33 | 103 | 0.19 | 0.23 |
| Comparative example 3 | 312 | 254 | 0.18 | 0.22 |

TABLE 2

| Unit | Cooling roll temp. °C. | Friction Coef. $\mu s$ | Friction Coef. $\mu d$ | Surface potential kV | Center line roughness Ra μm | Wrinkling incidence % | Winding deviation incidence % | Corona treating process discharge degree 1st W/cm$^2$ | Corona treating process discharge degree 2nd W/cm$^2$ |
|---|---|---|---|---|---|---|---|---|---|
| Example 4 | 80 | 0.32 | 0.20 | 3.5 | 0.04/0.08 | 0 | 0 | 9.1 | 2.1 |
| Example 5 | 80 | 0.26 | 0.16 | 3.0 | 0.04/0.08 | 0 | 1.4 | 9.1 | 1.2 |
| Example 6 | 20 | 0.92 | 0.87 | 3.5 | 0.02/0.02 | 5.6 | 4.2 | 9.1 | 2.1 |
| Comparative example 4 | 80 | 0.08 | 0.00 | 8.0 | 0.04/0.08 | 2.8 | 15.3 | 9.1 | 0 |
| Comparative example 5 | 80 | 0.20 | 0.02 | 4.0 | 0.04/0.08 | 2.8 | 16.7 | 4.8 | 4.8 |
| Comparative example 6 | 80 | 0.12 | 0.08 | 5.0 | 0.04/0.08 | 9.7 | 11.1 | 2.1 | 9.1 |
| Comparative example 7 | 80 | 0.89 | 0.75 | 10.2 | 0.04/0.08 | 18.1 | 0 | 9.1 | 2.1* |
| Compartive example 8 | 80 | 1.06 | 0.98 | 11.3 | 0.04/0.08 | 25.0 | 0 | 9.1 | 2.1 2.1* |

*: reverse surface processed

Industrial Applicability

According to the invention, it was possible to provide a plastic film that was excellent in winding-up characteristic and running characteristic under a high-speed condition and that was inapt to cause wrinkling and winding deviation.

What is claimed is:

1. A plastic film wherein at least 1,000 positive electrified patterns having areas of at most 10 mm$^2$ and arbitrary shapes, and at least 1,000 negatively electrified patterns having areas of at most 10 mm$^2$ and arbitrary shapes are distributed per 100 cm$^2$ of the film.

2. A plastic film according to claim 1, wherein an average area of the positively electrified patterns and the negatively electrified patterns is within a range of 0.2 mm$^2$ to 1.0 mm$^2$.

3. A plastic film according to claim 1, wherein at least one positively electrified pattern and at least one negatively electrified pattern exist in an arbitrary circle having a diameter of 1 cm on a surface of the plastic film.

4. A plastic film according to any one of claims 1 to 3, wherein the film is formed from a polypropylene.

5. A plastic film according to claim 1, wherein a surface of the film is subjected to a corona treating process.

6. A plastic film according to claim 5, wherein the corona treating process is performed on only one surface of the film.

7. A production method for a plastic film according to claim 1, wherein one film surface is subjected to a plurality of corona treating process, and a discharge degree of a last-performed corona treating process is at most 4 W/cm$^2$.

8. A production method for a plastic film according to claim 7, wherein one film surface is subjected to a plurality of corona treating processes that include at least one process with a discharge degree of at most 4 W/cm$^2$ and at least one process with a discharge degree greater than 4 W/cm$^2$, and wherein a last-performed process has a discharge degree of at most 4 W/cm$^2$.

9. A production method for a plastic film according to claim 7 or 8, wherein only one surface of the film is subjected to the corona treating processes.

10. A polypropylene film wherein at least 2,000 positive electrified patterns having areas of at most 10 mm$^2$ and arbitrary shapes, and at least 2,000 negatively electrified patterns having areas of at most 10 mm$^2$ and arbitrary shapes are distributed per 100 cm$^2$ of the film.

11. A polypropylene film according to claim 10, wherein at least 3,000 positive electrified patterns having areas of at most 10 mm$^2$ and arbitrary shapes, and wherein an average area of the positively electrified patterns is at most 0.5 mm$^2$.

12. A polypropylene film according to claim 10, wherein a wetting tension of a surface of the film is at least 34 mN/m.

13. A polypropylene film according to claim 10, wherein an absolute value of a surface potential of the polypropylene film is at most 5 kV.

14. A polypropylene film according to claim 10, wherein a center-line average roughness Ra of a surface is at least 0.02 mm and at most 0.5 mm.

* * * * *